United States Patent [19]
Higashimoto

[11] Patent Number: 5,638,746
[45] Date of Patent: Jun. 17, 1997

[54] PICKLE SOLUTION FEEDING SYSTEM

[75] Inventor: Tsuyoshi Higashimoto, Ikoma, Japan

[73] Assignee: Higashimoto Kikai Co., Ltd., Japan

[21] Appl. No.: 606,742

[22] Filed: Feb. 27, 1996

[30] Foreign Application Priority Data

Nov. 24, 1995 [JP] Japan ................................. 7-329625

[51] Int. Cl.⁶ ............................. A22C 9/00; A22C 17/00
[52] U.S. Cl. ................................ 99/532; 99/487; 99/535
[58] Field of Search .................... 99/516–517, 532–535,
99/487, 486, 494; 426/281, 652, 231, 264;
452/141, 142, 174, 198; 111/92; 27/24.1

[56] References Cited

U.S. PATENT DOCUMENTS

| | | | |
|---|---|---|---|
| 4,498,378 | 2/1985 | Norrie et al. | 99/472 |
| 4,522,118 | 6/1985 | Simonsen et al. | 99/472 |
| 4,864,922 | 9/1989 | Higashimoto | 99/533 |
| 4,881,458 | 11/1989 | Higashimoto | 99/535 X |
| 5,307,737 | 5/1994 | Higashimoto | 99/533 |
| 5,323,694 | 6/1994 | Higashimoto | 99/487 X |
| 5,507,221 | 4/1996 | Lagares-Corominas | 99/532 |

Primary Examiner—Timothy F. Simone
Attorney, Agent, or Firm—Kirschstein, et al.

[57] ABSTRACT

According to the invention, there is provided a pickle solution feeding system for feeding a pickle solution into injection needle means in a pickle solution injecting apparatus. The injection needle means is adapted to be thrust into raw meat for injecting the pickle solution thereinto. The pickle solution feeding system comprises a pickle solution making apparatus for making the pickle solution, and storage tank means for storing the pickle solution therein. First flow path means connects the pickle solution making apparatus to the storage tank means to direct the pickle solution into the storage tank means from the pickle solution making apparatus. The storage tank means includes chilling means for chilling the pickle solution therein. Vacuum means is connected to the storage tank means for making the storage tank means vacuous to remove bubbles from the pickle solution in the storage tank means. Second flow path means connects the storage tank means to the injection needle means to feed the pickle solution into the injection needle means from the storage tank means.

7 Claims, 2 Drawing Sheets

PICKLE SOLUTION FEEDING SYSTEM

FIELD OF THE INVENTION

The invention relates to a pickle solution injecting apparatus including injection needle means adapted to be thrust into a raw meat for injecting a pickle solution thereinto. In particular, the invention relates to a pickle solution feeding system for feeding the pickle solution into the injection needle means in the pickle solution injecting apparatus.

PRIOR ART

In order to make a ham or the like, there has been generally used a pickle solution injecting apparatus including a plurality of injection needles adapted to be thrust into a raw meat for injecting a pickle solution thereinto, as disclosed in U.S. Pat. No. 4,881,458. In the apparatus in the patent, the injection needles are disposed above a feed conveyor. A raw meat is intermittently fed along the upper surface of the conveyor. A raw meat is intermittently fed along the upper surface of the conveyor to the position of the injection needles. The injection needles are lowered toward and thrust into the raw meat for injecting a pickle solution thereinto on the conveyor.

In the process for injecting the pickle solution into the raw meat, it is required to keep the pickle solution being chilled before injecting, since the temperature of the pickle solution has an effect on the quality of the product. It is also required to keep the pickle solution being free of bubbles, otherwise the quality of the product is lowered by the bubbles. Accordingly, heretofore, a pickle solution making apparatus has been installed in a chilling room. The pickle solution making apparatus intended to blend and mix a powdered material and a water to make a pickle solution. The pickle solution is then stored and kept in the chilling room during the night to chill the pickle solution and remove the bubbles therefrom. The pickle solution is then put into a wagon or bucket in the chilling room and carried to the pickle solution injecting apparatus from the chilling room. The pickle solution injecting apparatus includes a receptacle, the pickle solution being put into the receptacle and directed to the injection needles.

However, even if the pickle solution has been chilled in the chilling room, it will be exposed to and warmed by air when carried by the wagon or bucket. It is therefore difficult to keep the pickle solution being chilled before injecting. In addition, even if the bubbles has been removed from the pickle solution to some degree after keeping it in the chilling room during the night, the air will be absorbed into the pickle solution when carried by the wagon or bucket and exposed to the air, to thereby generate the bubbles in the pickle solution. It is therefore difficult to keep the pickle solution being free of bubbles before injecting. The pickle solution may be contaminated with bacteria when exposed to the air, making it insanitary. It is inefficient to keep the pickle solution in the chilling room during the night after making it. Further, it has a problem that labour and time are required to carry the pickle solution to the pickle solution injecting apparatus from the chilling room.

SUMMARY OF THE INVENTION

It is an object of the invention to provide a pickle solution feeding system for feeding a pickle solution into injection needle means in a pickle solution injecting apparatus, in which the above problems are overcome.

Other object of the invention is to chill the pickle solution and remove the bubbles therefrom after making it, and then feed the pickle solution into the injection needle means without exposing it to the air to thereby keep the pickle solution being chilled and being free of bubbles before injecting.

According to the invention, there is provided a pickle solution feeding system for feeding a pickle solution into injection needle means in a pickle solution injecting apparatus. The injection needle means is adapted to be thrust into raw meat for injecting the pickle solution thereinto.

The pickle solution feeding system comprises a pickle solution making apparatus for making the pickle solution, and storage tank means for storing the pickle solution therein. First flow path means connects the pickle solution making apparatus to the storage tank means to direct the pickle solution into the storage tank means from the pickle solution making apparatus. The storage tank means includes chilling means for chilling the pickle solution therein. Vacuum means is connected to the storage tank means for making the storage tank means vacuous to remove bubbles from the pickle solution in the storage tank means. Second flow path means connects the storage tank means to the injection needle means to feed the pickle solution into the injection needle means from the storage tank means.

In a preferred embodiment, the pickle solution making apparatus includes means for blending and mixing a powdered material and a water to make the pickle solution.

The storage tank means has a double walled structure including outer and inner walls. The chilling means comprises chilling jacket means formed between the outer and inner walls of the storage tank means. Chilling liquid supply means is connected to the chilling jacket means to feed a chilling liquid to the chilling jacket means. The vacuum means comprises vacuum pump means connected to the storage tank means.

The storage tank means comprises a plurality of storage tanks each connected to the pickle solution making apparatus and the injection needle means. The pickle solution is chilled by the chilling means in each of the storage tanks. The bubbles are removed from the pickle solution by the vacuum means in each of the storage tanks. The pickle solution is fed to the injection needle means from one of storage tanks when the pickle solution is directed to other storage tank from the pickle solution making apparatus. The pickle solution is stored in other storage tank so that the pickle solution can be then fed to the injection needle means from other storage tank when the pickle solution has been consumed in one of storage tanks.

The pickle solution feeding system further comprises cleaning liquid supply means for feeding a cleaning liquid into at least one of the pickle solution making apparatus, the first flow path means, the storage tank means, the second flow path means and the injection needle means to clean at least one of the interiors of the pickle solution making apparatus, the first flow path means, the storage tank means, the second flow path means and the injection needle means by the cleaning liquid.

In other embodiment, there is provided a suspension feeding system for feeding a suspension, which comprises a frozen trim consisting of fat and lean meat and suspended in a pickle solution, into injection needle means in a suspension injecting apparatus. The injection needle means is adapted to be thrust into a raw meat for injecting the suspension thereinto.

The suspension feeding system comprises a suspension making apparatus for blending and mixing the frozen trim and the pickle solution to make the suspension, and storage tank means for storing the suspension therein. First flow path means connects the suspension making apparatus to the storage tank means to direct the suspension into the storage tank means from the suspension making apparatus. The storage tank means includes chilling means for chilling the suspension therein. Vacuum means is connected to the storage tank means for making the storage tank means vacuous to remove bubbles from the suspension in the storage tank means. Second flow path means connects the storage tank means to the injection needle means to feed the suspension into the injection needle means from the storage tank means.

A tray may be disposed in the suspension injecting apparatus for receiving a liquid dropping from the raw meat when injecting the suspension into the raw meat in the suspension injecting apparatus. A collection tank is connected to the tray to direct and collect the dropping liquid into the collection tank from the tray. Third flow path means connects the collection tank to the suspension making apparatus to direct the dropping liquid into the suspension making apparatus from the collection tank and blend and mix the dropping liquid with the suspension in the suspension making apparatus.

DETAILED DESCRIPTION OF THE PREFERRED EMBODIMENT

Figure 1:
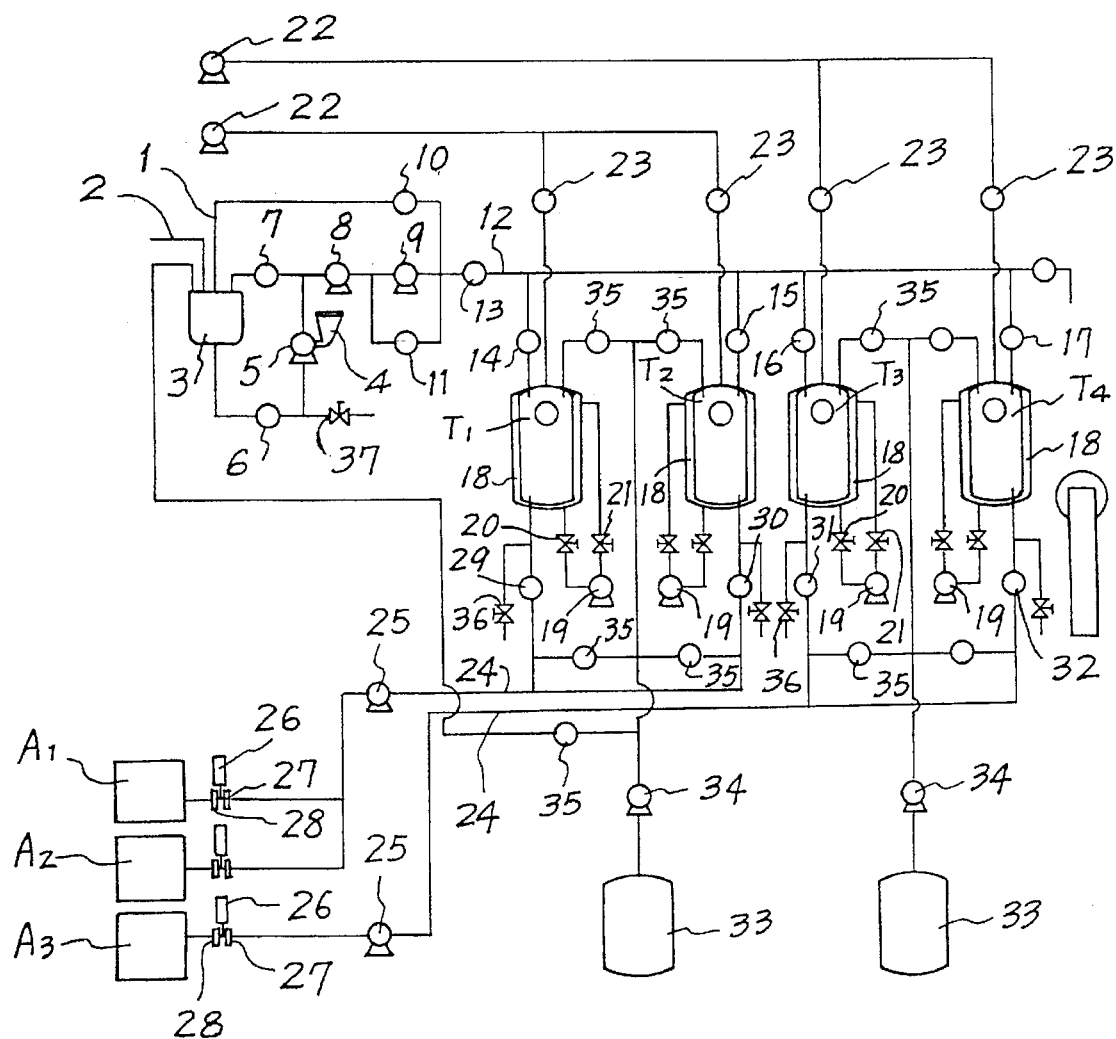
FIG. 1 is a schematic view of a preferred embodiment of the invention.

Referring to FIG. 1, a pickle solution feeding system according to the invention is shown, which includes a pickle solution making apparatus 1. The apparatus 1 is intended to blend and mix a powdered material and a water to make a pickle solution. The water is chilled by a conventional chilling apparatus not shown and connected to a pipe 2, and then directed into a circulation tank 3 through the pipe 2. The powdered material is put into a hopper 4 which is communicated with a screw pump 5. Valves 6 and 7 are opened when the screw pump 5 is driven so that the water is drawn from the circulation tank 3 at the bottom thereof and sucked into the screw pump 5 through the valve 6. The water is then fed by the screw pump 5 and directed and circulated into the circulation tank 3 at the top thereof through the valve 7. The powered material is directed into the screw pump 5 from the hopper 4. The screw pump 5 includes screw means received and rotated therein so that the powdered material and the water are blended and mixed by the screw means and directed and circulated into the circulation tank 3, to thereby make a pickle solution.

A feed pump 8 and a rotary mill 9 may be driven besides the screw pump 5 when a valve 10 is opened and the valve 7 is closed so that the pickle solution is fed by the screw pump 5 and the feed pump 8, passed through the rotary mill 9 and directed and circulated into the circulation tank 3 at the top thereof through the valve 10. The powdered material is therefore ground into particles by the rotary mill 9. A valve 11 may be opened when the rotary mill 9 is stopped so that the pickle solution is circulated through the valves 11 and 10 to bypass the rotary mill 9. The screw pump 5 and the rotary mill 9 are conventional and known.

The pickle solution feeding system further includes storage tank means which comprises four storage tanks T1 and T4 for storing the pickle solution therein. The pickle solution feeding system further includes first flow path means for connecting the pickle solution making apparatus 1 to the storage tanks T1 to T4 to direct the pickle solution into the storage tanks T1 to T4 to direct the pickle solution into the storage tanks T1 to T4 from the pickle solution making apparatus 1. The first flow path means comprises a flow path 12 including a valve 13 to which the storage tanks T1 to T4 are connected by means of valves 14 to 17. The valve 13 is connected to the rotary mill 9 and the valve 11 in the pickle solution making apparatus 1.

The storage tanks T1 to T4 each includes chilling means for chilling the pickle solution therein. In the embodiment, the storage tanks T1 to T4 each has a double walled structure including outer and inner walls, the chilling means comprising chilling jacket means 18 formed between the outer and inner walls of the storage tank. The chilling means further comprises chilling liquid supply means 19 including a chilling plate and a feed pump and connected to the chilling jacket means 18 by means of valves 20 and 21.

The pickle solution feeding system further includes vacuum means connected to the storage tanks T1 to T4 for making the storage tanks T1 to T4 vacuous to remove bubbles from the pickle solution in the storage tanks T1 to T4. The vacuum means comprises vacuum pump means 22 connected to the storage tanks T1 to T4. In the embodiment, two vacuum pumps 22 are connected to the storage tanks T1 to T4 by means of four valves 23.

In the embodiment, there is provided three pickle solution injecting apparatuses A1 to A3. The apparatuses A1 to A3 each includes injection needle means comprising a plurality of injection needles which are adapted to be thrust into a raw meat for injecting the pickle solution thereinto. The pickle solution feeding system further includes second flow path means for connecting the storage tanks T1 to T4 to the injection needle means in the pickle solution injecting apparatus A1 to A3 to feed the pickle solution into the injection needle means from the storage tanks T1 to T4. In this connection, the second flow path means comprises two flow paths 24, one of which 24 connects two storage tanks T1 and T2 to the injection needles in two apparatuses A1 and A2. The other flow path 24 connects two storage tanks T3 and T4 to the injection needles in one apparatus A3. The flow paths 24 each includes a feed pump 25 while the apparatuses A1 to A3 each includes a plunger pump 26 and two check valves 27 and 28, the storage tanks T1 to T4 being connected to the feed pumps 25 by means of four valves 29 to 32. The feed pumps 25 are connected to the injection needles in the apparatuses A1 to A3 by means of the check valves 27, the plunger pumps 26 and the check valves 28. The plunger pump 26 includes a plunger advanced and retracted in a cylinder synchronously with the injection needles in each of the injection apparatuses A1 to A3.

The pickle solution feeding system further includes cleaning liquid supply means which comprises cleaning liquid reservoirs 33 connected to feed pumps 34. The feed pumps 34 are connected to the storage tanks T1 to T4 by means of valves 35 to feed a cleaning liquid into the storage tanks T1 to T4. The storage tanks T1 to T4 each includes a valve 36 adapted to discharge the cleaning liquid. The feed pumps 34 are further connected to the second flow paths 24 by means of valves 35 and the circulation tank 3 in the pickle solution making apparatus 1 by means of a valve 35. The apparatus 1 includes a valve 37 connected to the circulating flow path thereof to discharge the cleaning liquid.

In the system, after making the pickle solution in the pickle solution making apparatus 1, the valve 6 is opened, the valve 7, 10 and 11 being closed, the screw pump 5, the feed pump 8 and the rotary mill 9 being driven. The valves 13 and 14 are opened so that the pickle solution is fed by the screw pump 5 and the feed pump 8 and directed into the storage tank T1 through the rotary mill 9 and the valves 13 and 14. The pickle solution is stored in the storage tank T1. The valve 11 may be opened when the rotary mill 9 is stopped so that the pickle solution is directed through the valve 11 to bypass the rotary mill 9.

The valve 15 may be opened instead of the valve 14 so that the pickle solution is directed into the storage tank T2 through the valve 15. The valve 16 may be opened instead of the valve 15 so that the pickle solution is directed into the storage tank T3 through the valve 16. The valve 17 may opened instead of the valve 16 so that the pickle solution is directed into the storage tank T4 through the valve 17. Accordingly, the pickle solution may be stored in all the storage tanks T1 to T4.

In each of the storage tanks T1 to T4, the chilling liquid supply means 19 is driven so that the chilling liquid is electrically chilled by the chilling plate in the chilling liquid supply means 19. The valves 20 and 21 are opened so that the chilling liquid is fed by the feed pump in the chilling liquid supply means 19 and directed into the chilling jacket means 18 at the bottom thereof through the valve 20. The chilling liquid is then drawn from the chilling jacket means 18 at the top thereof and returned to the chilling liquid supply means 19 through the valve 21 so that the chilling liquid is again chilled in the chilling liquid supply means 19 and then directed and circulated into the chilling jacket means 18. The pickle solution may therefore chilled by the chilling liquid in the chilling jacket means 18 in each of the storage tanks T1 to T4. The pickle solution is kept being chilled.

In addition, the vacuum pumps 22 are driven to suck an air. The valves 23 are opened so that the air is directed into the vacuum pumps 22 from the storage tanks T1 to T4 through the valves 23 to make the storage tanks T1 to T4 vacuous. This removes bubbles from the pickle solution in the storage tanks T1 to T4. The pickle solution is kept being free of the bubbles.

In two storage tanks T1 and T2, the valve 29 or 30 is then opened so that the pickle solution is directed to the feed pump 25 from the storage tank T1 or T2. In two storage tanks T3 and T4, the valve 31 or 32 may be opened so that the pickle solution is directed to the feed pump 25 from the storage tank T3 or T4. The feed pumps 25 are driven so that the pickle solution is fed by the feed pumps 25 to the check valves 27 and the plunger pumps 26. In the plunger pumps 26, the plungers are retracted in the cylinders synchronously with the injection needles in the apparatuses A1 to A3 whenever the injection needles are drawn from the raw meat so that the pickle solution is sucked into the cylinders in the plunger pumps 26 through the check valves 27. The plungers are then advanced in the cylinders synchronously with the injection needles in the apparatuses A1 to A3 whenever the injection needles are thrust into the raw meat so that the pickle solution is fed by the plunger pumps 26 into the injection needles through the check valves 28. The pickle solution is therefore injected into the raw meat whenever the injection needles are thrust into the raw meat in the apparatuses A1 to A3.

In the system, two storage tanks T1 and T2 are alternatively used to feed the pickle solution to the injection needles in the apparatuses A1 and A2. For example, the pickle solution is fed to the injection needles from one of storage tanks T1 when the pickle solution is directed into other storage tank T2 from the pickle solution making apparatus 1. The pickle solution is stored in other storage tank T2. Accordingly, the pickle solution can be fed to the injection needles from other storage tank T2 when the pickle solution has been consumed in one of storage tanks T1. The pickle solution is then directed into the storage tank T1 from the pickle solution making apparatus 1 and stored in the storage tank T1. Two storage tanks T3 and T4 are alternatively used to feed the pickle solution to the injection needles in the apparatus A3. For example, the pickle solution is fed to the injection needles from one of storage tanks T3 when the pickle solution is directed into other storage tank T4 from the pickle solution making apparatus 1. The pickle solution is stored in other storage tank T4. Accordingly, the pickle solution can be fed to the injection needles from other storage tank T4 when the pickle solution has been consumed in one of storage tanks T3. The pickle solution is then directed into the storage tank T3 from the pickle solution making apparatus 1 and stored in the storage tank T3.

After the operation of injecting apparatuses A1 to A3, the feed pumps 34 are driven to feed the cleaning liquid from the reservoirs 33. The valves 35 are opened for directing the cleaning liquid into at least one of the pickle solution making apparatus 1, the first flow path 12, the storage tanks T1 to T4, the second flow paths 24 and the injection needles to clean at least one of the interiors of the pickle solution making apparatus 1, the first flow path 12, the storage tanks T1 to T4, the second flow paths 24 and the injection needles.

The system may include sensors for detecting the levels of pickle solution in the storage tanks T1 to T4 when the pickle solution is directed into the storage tanks T1 to T4 from the pickle solution making apparatus 1 to operate and control the pickle solution making apparatus 1 and the valves 14 to 17 in response to the signals from the sensors. The sensors may detect the levels of pickle solution in the storage tanks T1 to T4 when the pickle solution is fed into the injection needles from the storage tanks T1 to T4 to operate and control the valves 29 to 32 in response to the signals from the sensors. The system may include a computer for automation.

Accordingly, in the system, after making the pickle solution, the pickle solution is directed into and stored in the storage tanks T1 to T4. The pickle solution is chilled in the storage tanks T1 to T4. The bubbles are removed from the pickle solution in the storage tanks T1 to T4. The pickle solution is then fed into the injection needles in the apparatuses A1 to A3 without exposing it to the air. The system can therefore keep the pickle solution being chilled and being free of bubbles before injecting, resulting in high quality of the product. The pickle solution is not contaminated with bacteria. It is sanitary. Unlike the prior art, it is not necessary to keep the pickle solution in the chilling room during the night after making it. It is efficient. It is also not necessary to carry the pickle solution to the injecting apparatus from the chilling room. Labour and time are not required.

Figure 2:
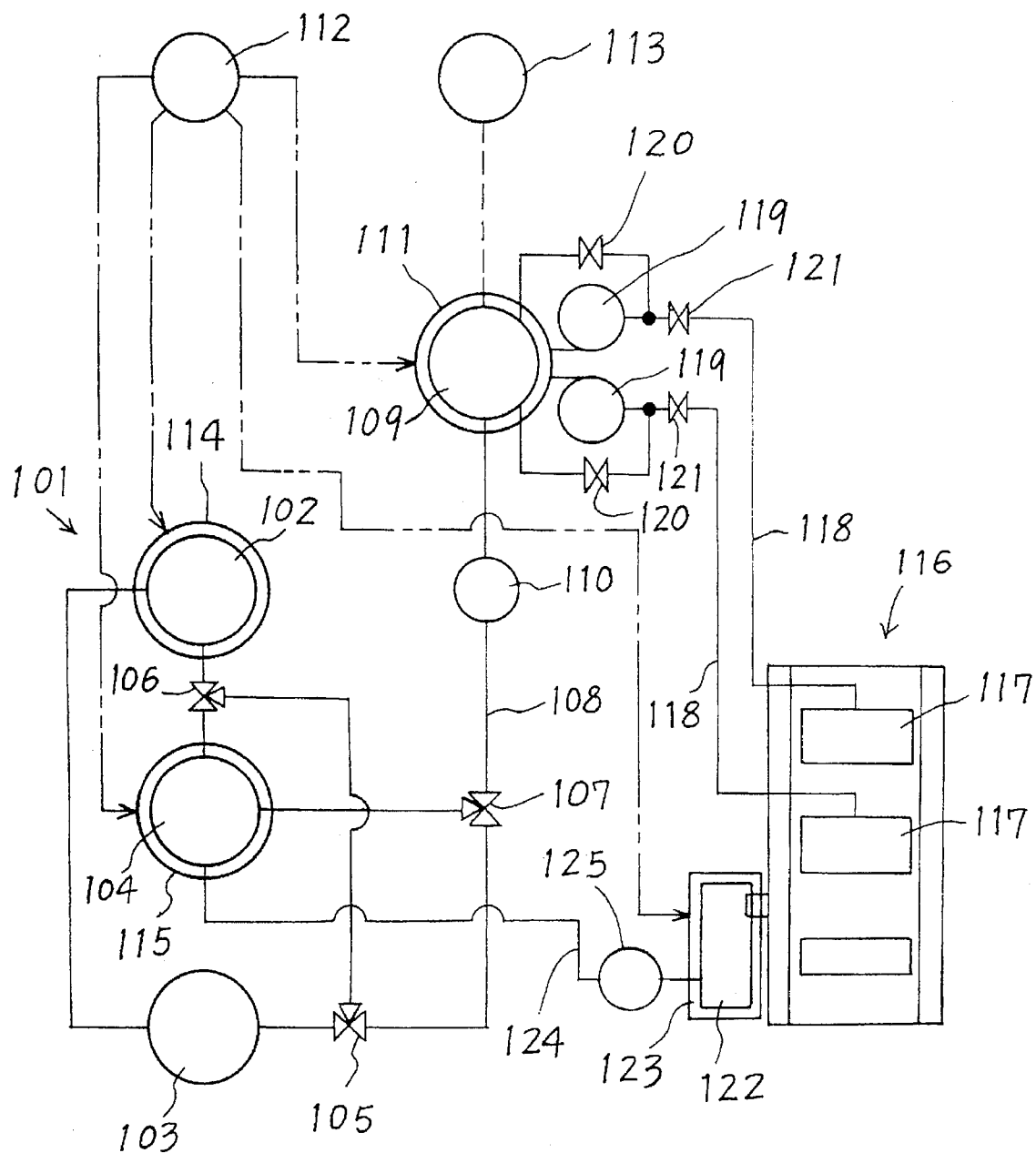
FIG. 2 is a schematic view of other embodiment of the invention.

Referring to FIG. 2, a suspension feeding system according to the invention is shown, which includes a suspension making apparatus 101 for making a suspension. The suspension comprises a frozen trim consisting of fat and lean meat and suspended in a pickle solution. The suspension making apparatus 101 comprises a power pump 102, a micro-cutter 103 and a regenerative tank 104. The power pump 102 includes a lift and a hopper so that the frozen trim can be lifted by the lift and put into the hopper. As to the pickle solution, a powdered material and a water are put into the hopper of the power pump 102. The power pump 102 is connected to the micro-cutter 103 and the regenerative tank 104 by means of valves 105, 106 and 107.

The suspension feeding system further includes first flow path means comprising a flow path 108 for connecting the suspension making apparatus 101 to a storage tank 109 to direct the suspension into the storage tank 109 from the suspension making apparatus 101. The storage tank 109 is intended to store the suspension therein. The first flow path 108 includes a magnet filter 110, the micro-cutter 103 being connected to the magnet filter 110 and the storage tank 109 by means of the valves 105 and 107. The storage tank 109 includes an agitator received therein to agitate the suspension.

The storage tank 109 includes chilling means for chilling the suspension therein. In the embodiment, the storage tank 109 has a double walled structure including outer and inner walls, the chilling means comprising chilling jacket means 111 formed between the outer and inner walls of the storage tank 109. The chilling means further comprises chilling liquid supply means 112 including a chilling plate and a feed pump and connected to the chilling jacket means 111. The suspension feeding system further includes vacuum means comprising a vacuum pump 113 which is connected to the storage tank 109 for making the storage tank 109 vacuous to remove bubbles from the suspension in the storage tank 109.

In the suspension making apparatus 101, like the storage tank 109, the power pump 102 has a double walled structure including outer and inner walls between which a chilling jacket means 114 is formed. The regenerative tank 104 also has a double walled structure including outer and inner walls between which a chilling jacket means 115 is formed. The chilling liquid supply means 112 is connected to the chilling jacket means 114 and 115.

A suspension injecting apparatus 116 includes injection needle means comprising a plurality of injection needles and mounted on a pair of injection heads 117. The injection needles are adapted to be thrust into a raw meat to inject the suspension thereinto. The suspension feeding system includes second flow path means comprising two flow paths 118 for connecting the storage tank 109 to the injection needles of the injection heads 117. The second flow paths 118 each includes a plunger pump 119 and two check valves 120 and 121, the storage tank 109 being connected to the injection needles by means of the check valve 120, the plunger pump 119 and the check valve 121.

The suspension injecting apparatus 116 further includes a tray disposed therein for receiving a liquid dropping from the raw meat when injecting the suspension into the raw meat in the suspension injecting apparatus 116. A collection tank 122 is connected to the tray to direct and collect the dropping liquid into the collection tank 122 from the tray. The collection tank 122 has a double walled structure including outer and inner walls between which a chilling jacket means 123 is formed. The chilling liquid supply means 112 is connected to the chilling jacket means 123.

The collection tank 122 includes a feed pump received therein. The suspension feeding system further includes third flow path means comprising a flow path 124 for connecting the collection tank 122 to the suspension making apparatus 101. The third flow path 124 includes a sterization apparatus 125 of heating, ultraviolet or high pressure type for sterize the dropping liquid. The collection tank 122 is connected to the regenerative tank 104 in the suspension making apparatus 101 by means of the sterization apparatus 125.

In the suspension making apparatus 101, the frozen trim is put into the hopper of the power pump 102. As to the pickle solution, the powdered material and the water are put into the hopper of the power pump 102. The power pump 102 and the micro-cutter 103 are driven so that the frozen trim, the powdered material and the water are fed by the power pump 102 and directed into the micro-cutter 103. The frozen trim and the powdered material are ground into particles by the micro-cutter 103. The frozen trim, the powdered material and the water are then directed and circulated into the power pump 102 through the valves 105 and 106. The powdered material and the water are blended and mixed by the power pump 102 and the micro-cutter 103 to make a pickle solution. In addition, the frozen trim and the pickle solution are blended and mixed by the power pump 102 and the micro-cutter 103 to make a suspension in which the frozen trim is suspended in the pickle solution.

The chilling liquid supply means 112 is driven so that the chilling liquid is electrically chilled by the chilling plate in the chilling liquid supply means 112. The chilling liquid is then fed by the feed pump in the chilling liquid supply means 112 and directed into the chilling jacket means 114 at one end thereof in the power pump 102. The chilling liquid is then drawn from the chilling jacket means 114 at the other end thereof and returned to the chilling liquid supply means 112 so that the chilling liquid is again chilled in the chilling liquid supply means 112 and then directed and circulated into the chilling jacket means 114. The frozen trim and the pickle solution are chilled by the chilling liquid in the chilling jacket means 114 to make the suspension at low temperature in the suspension making apparatus 101.

After making the suspension in the suspension making apparatus 101, the suspension is fed by the power pump 102 and directed into the storage tank 109 through the micro-cutter 103, the valves 105 and 107 and the magnet filter 110. The magnet filter 110 attracts irons contained in the suspension so that the irons are removed from the suspension. The suspension is then stored in the storage tank 109. The suspension may be agitated by the agitator in the storage tank 109 not to be deposited.

As to the storage tank 109, like the chilling jacket means 114 in the power pump 102, the chilling liquid is fed by the feed pump in the chilling liquid supply means 112 and directed into the chilling jacket means 111 at one end thereof in the storage tank 109. The chilling liquid is then drawn from the chilling jacket 111 at the other end thereof, returned to the chilling liquid supply means 112, again chilled in the chilling liquid supply means 112 and directed and circulated into the chilling jacket means 111. The suspension is therefore chilled by the chilling liquid in the chilling jacket means 111 in the storage tank 109. The suspension is kept being chilled.

In addition, the vacuum pump 113 is driven so that air is directed and sucked into the vacuum pump 113 from the storage tank 109 to make the storage tank 109 vacuous. This removes bubbles from the suspension in the storage tank 109. The suspension is kept being free of the bubbles.

The suspension is then directed into the plunger pumps 119 through the check valves 120. In the plunger pumps 119, the plungers are retracted in the cylinders synchronously with the injection needles in the suspension injecting apparatus 116 whenever the injection needles are drawn from the raw meat so that the suspension is sucked into the cylinders in the plunger pumps 119. The plungers are then advanced in the cylinders synchronously with the injection needles whenever the injection needles are thrust into the raw meat so that the suspension is fed by the plunger pumps 119 into the injection needles. The suspension is therefore injected into the raw meat whenever the injection needles are thrust into the raw meat in the suspension injecting apparatus 116.

In the suspension injecting apparatus 116, the tray receives a liquid dropping from the raw meat when injecting the suspension into the raw meat. The dropping liquid is directed and collected into the collection tank 122 from the tray. In the collection tank 122, the chilling liquid is fed by the feed pump in the chilling liquid supply means 112 and directed into the chilling jacket means 123 at one end thereof. The chilling liquid is then drawn from the chilling jacket means 123 at the other end thereof, returned to the chilling liquid supply means 112, again chilled in the chilling liquid supply means 112 and directed and circulated into the chilling jacket 123. The dropping liquid is therefore chilled by the chilling liquid in the chilling jacket means 123 in the collecting tank 122.

The dropping liquid is then fed by the feed pump in the collection tank 122 when it reaches a predetermined level in the collection tank 122. The dropping liquid is directed into the regenerative tank 104 in the suspension making apparatus 101 through the sterization apparatus 125. In the sterization apparatus 125, the dropping liquid is sterized by a heat, ultraviolet or high pressure. In the regenerative tank 104, the chilling liquid is fed by the feed pump in the chilling liquid supply means 112 and directed into the chilling jacket means 115 at one end thereof. The chilling liquid is then drawn from the chilling jacket means 115 at the other end thereof, returned to the chilling liquid supply means 112, again chilled in the chilling liquid supply means 112 and directed and circulated into the chilling jacket means 115. The dropping liquid is therefore chilled by the chilling liquid in the chilling jacket means 115 in the regenerative tank 104.

In the suspension making apparatus 101, the suspension may fed by the power pump 102 and directed into the regenerative tank 104 through the micro-cutter 103 and the valves 105 and 107 and joined with the dropping liquid in the regenerative tank 104. The suspension and the dropping liquid are then directed and circulated into the power pump 102 through the valve 106 so that the suspension is blended and mixed with the dropping liquid. The blended and mixed suspension and dropping liquid may then be directed into and stored in the storage tank 109. The blended and mixed suspension and dropping liquid may then be directed into the injection needles and injected into the raw meat in the suspension injecting apparatus 116.

What is claimed is:

1. A pickle solution feeding system for feeding a pickle solution into injection needle means in a pickle solution injecting apparatus, said injection needle means being adapted to be thrust into a raw meat for injecting the pickle solution thereinto, said pickle solution feeding system comprising:

a pickle solution making apparatus for making the pickle solution;

storage tank means for storing the pickle solution therein;

first flow path means for connecting said pickle solution making apparatus to said storage tank means to direct the pickle solution into said storage tank means from said pickle solution making apparatus;

said storage tank means including chilling means for chilling the pickle solution therein;

vacuum means connected to said storage tank means for making said storage tank means vacuous to remove bubbles from the pickle solution in said storage tank means; and second flow path means for connecting said storage tank means to said injection needle means to feed the pickle solution into said injection needle means from said storage tank means.

2. A system as set forth in claim 1, wherein said pickle solution making apparatus includes means for blending and mixing a powdered material and a water to make the pickle solution.

3. A system as set forth in claim 2, wherein said storage tank means has a double walled structure including outer and inner walls, said chilling means comprising chilling jacket means formed between said outer and inner walls of said storage tank means, chilling liquid supply means being connected to said chilling jacket means to feed a chilling liquid to said chilling jacket means, said vacuum means comprising vacuum pump means connected to said storage tank means.

4. A system as set forth in claim 3, wherein said storage tank means comprises a plurality of storage tanks each connected to said pickle solution making apparatus and said injection needle means, the pickle solution being chilled by said chilling means in each of said storage tanks, the bubbles being removed from the pickle solution by said vacuum means in each of said storage tanks, the pickle solution being fed to said injection needle means from one of storage tanks when the pickle solution is directed to other storage tank from said pickle solution making apparatus, the pickle solution being stored in said other storage tank so that the pickle solution can be then fed to said injection needle means from said other storage tank when the pickle solution has been consumed in said one of storage tanks.

5. A system as set forth in claim 4, further comprising cleaning liquid supply means for feeding a cleaning liquid into at least one of said pickle solution making apparatus, said first flow path means, said storage tank means, said second flow path means and said injection needle means to clean at least one of the interiors of said pickle solution making apparatus, said first flow path means, said storage tank means, said second flow path means and said injection needle means by the cleaning liquid.

6. A suspension feeding system for feeding a suspension, which comprises a frozen trim consisting of fat and lean meat and suspended in a pickle solution, into injection needle means in a suspension injecting apparatus, said injection needle means being adapted to be thrust into a raw meat for injecting the suspension thereinto, said suspension feeding system comprising:

a suspension making apparatus for blending and mixing the frozen trim and the pickle solution to make the suspension;

storage tank means for storing the suspension therein;

first flow path means for connecting said suspension making apparatus to said storage tank means to direct the suspension into said storage tank means from said suspension making apparatus;

said storage tank means including chilling means for chilling the suspension therein;

vacuum means connected to said storage tank means for making said storage tank means vacuous to remove bubbles from the suspension in said storage tank means; and second flow path means for connecting said storage tank means to said injection needle means to feed the suspension into said injection needle means from said storage tank means.

7. A system as set forth in claim 6, further comprising:

a tray disposed in said suspension injecting apparatus for receiving a liquid dropping from the raw meat when injecting the suspension into the raw meat in said suspension injecting apparatus;

a collection tank connected to said tray to direct and collect the dropping liquid into the collection tank from said tray; and third flow path means for connecting said collection tank to said suspension making apparatus to direct the dropping liquid into said suspension making apparatus from said collection tank and blend and mix the dropping liquid with the suspension in said suspension making apparatus.

* * * * *